July 31, 1928.
A. W. BRUCE
1,679,153
LOCOMOTIVE TRUCK
Filed Oct. 15, 1926
3 Sheets-Sheet 3
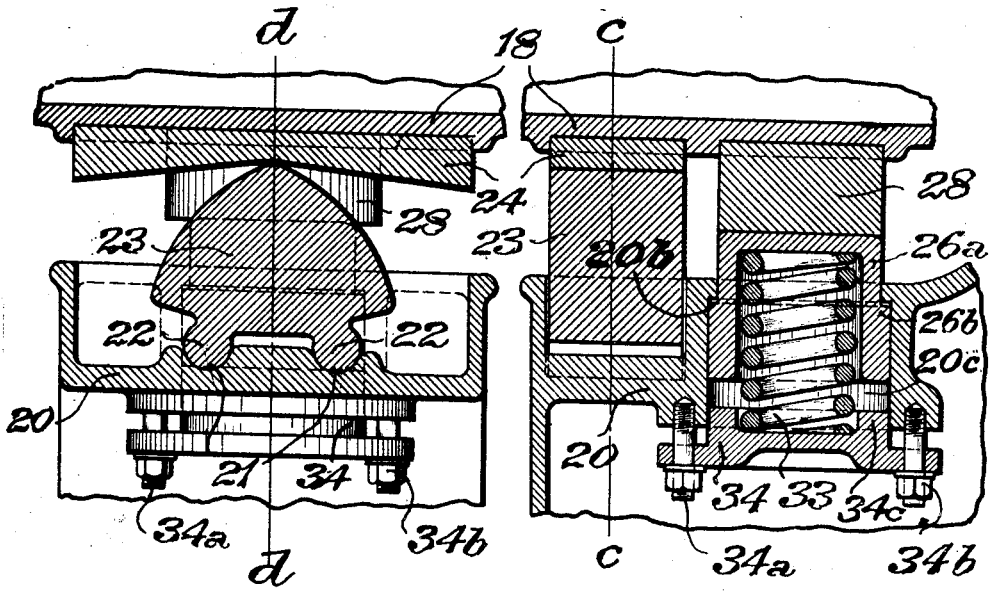
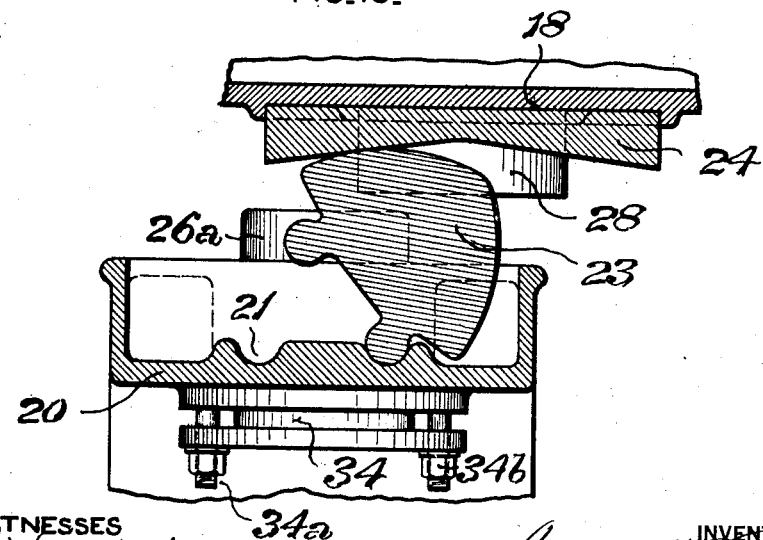
WITNESSES
INVENTOR Patented July 31, 1928.

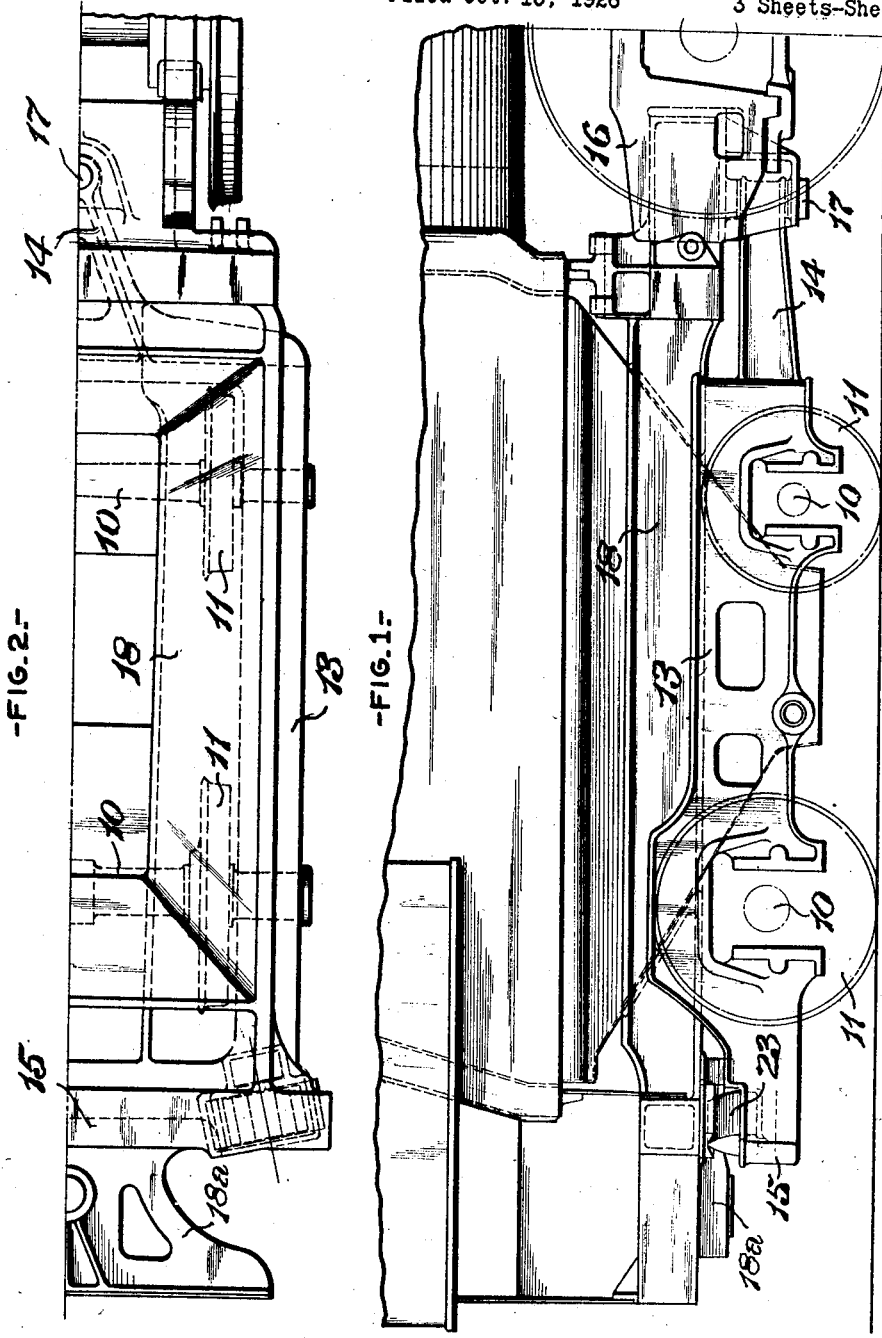

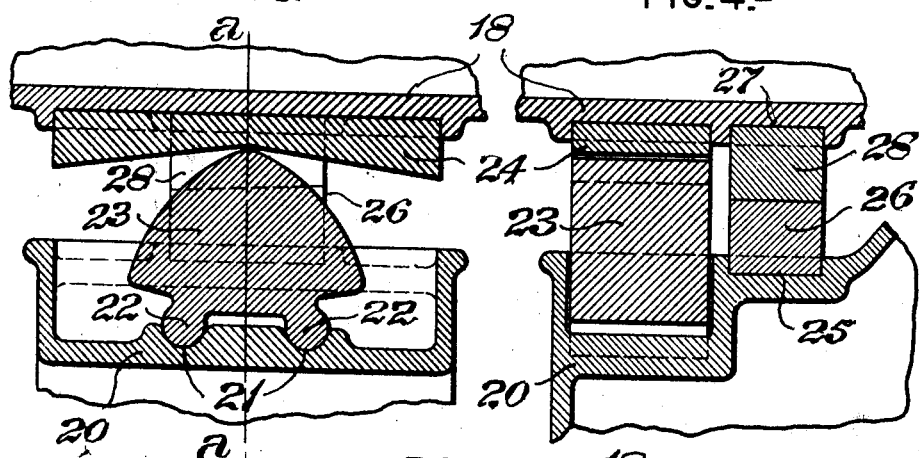

1,679,153

UNITED STATES PATENT OFFICE.

ALFRED W. BRUCE, OF NEW YORK, N. Y.

LOCOMOTIVE TRUCK.

Application filed October 15, 1926. Serial No. 141,811.

My invention more particularly relates to means for minimizing the vibration of locomotives, and absorbing the load normally carried by centering devices of locomotive truck coincides with the vertical longitudinal central plane of the locomotive, as when on tangent track, and has for an object to provide an appliance, which will be economical in manufacture, efficient in operation, and of great durability, and which, further, will function to minimize the vibration of the locomotive, and to remove the load from the rockers or rollers of the centering devices, when the truck is in longitudinal central position with relation to the locomotive, whereby steadier riding of the locomotive is attained, and the centering devices are relieved of a large amount of wear to which they have heretofore been subjected.

The improvement claimed is hereinafter fully set forth.

The centering devices employed in prior practice, for controlling lateral movement of the truck wheels on curved track, have usually embodied an upper and a lower bearing seat, and rockers or rollers, interposed between said seats. I have observed that when the truck is in longitudinal central position, with relation to the locomotive, the load of the rear end of the locomotive is borne upon the relatively small areas of contact between the rockers or rollers, and the seats, and that the constant lateral vibration of the locomotive, and the pounding, incident to piston thrust and irregularities in the track, produce rapid wear of the seats and rockers or rollers, with the result that the efficiency of such parts is quickly destroyed, and frequent renewal of the parts is required. I have, further, observed that, due to the limited area of contact between the seats and rockers or rollers, the centering devices do not prevent, in a satisfactory degree, lateral vibration of the locomotive. My present invention provides an appliance which relieves the seats and rockers, or rollers, of all load, when the locomotive is in longitudinal central position with relation to the truck, and which efficiently minimizes lateral vibration, producing a steadier riding locomotive. It is, however, within the contemplation of the invention to modify the appliance so that the seats and rockers, or rollers, will be relieved, on tangent, of a portion only, of the load borne by them on curved track.

In the accompanying drawings: Figure 1 is a partial side view, in elevation, of the rear portion of a locomotive, illustrating an application of my invention; Fig. 2, a half top or plan view, the boiler and fire box being removed; Fig. 3, a longitudinal cross section, on an enlarged scale, through a rocker centering device embodying my invention, the parts being shown in the position they occupy when the longitudinal central plane of the locomotive coincides with that of the truck; Fig. 4, a transverse section, on the line $a$ $a$ of Fig. 3; Fig. 5, a sectional view, similar to Fig. 3, the parts being shown, in the position they occupy when the truck is laterally displaced; Fig. 6, a longitudinal section through a geared roller centering device, the parts being shown in the position they occupy when the longitudinal central plane of the locomotive coincides with that of the truck; Fig. 7, a transverse section, on the line $b$ $b$ of Fig. 6; Fig. 8, a longitudinal section, on the line $c$ $c$ of Fig. 9 illustrating a modified form of vibration absorbing and load supporting appliance, combined with a rocker centering device; Fig. 9, a transverse section on the line $d$ $d$ of Fig. 8; and Fig. 10, a sectional view, similar to Fig. 8, the parts being shown in the position they occupy when the truck is laterally displaced.

In the practice of my invention, referring descriptively to the specific embodiment thereof which is herein exemplified, as applied in a locomotive having a four wheeled trailing truck, in which two axles, 10, 10, on each of which a pair of wheels, 11, is secured, are fitted to rotate in journal boxes, which are mounted, with the capacity of relative movement, in the side members, 13, of the truck frame, said members being formed integral with forwardly and inwardly extending radius bar arms, 14, and a rear transverse bar, 15. The truck frame is, in the usual manner, pivotally connected to the main frame, 16, of the locomotive, by a radius bar pin, 17, located in the longitudinal central plane of the truck, at the forward extremity of the radius bar arms.

The rear frame, 18, of the locomotive, is of the usual construction, comprising side members, which are rigidly secured to the main frame, and a transverse bumper casting, 18ª, which unites the rear ends of the side members.

Mounted on each of the rear corners of truck frame, is a lower bearing set, 20, having two transverse grooves, 21, for the reception of the ears, 22, of heart-shaped rockers, 23. An upper bearing seat, 24, is disposed above each of the rockers, and secured to the rear frame of the locomotive. Each upper seat, 24, is provided with oppositely inclined faces, which co-operate with the rocker to center the locomotive and truck.

The lower seat, 20, is provided with a pocket, 25, in which there is secured, by welding, bolting, or other suitable means, a load absorbing block, 26, having a bearing face, inclined at a lesser angle than the bearing faces of the upper seat. The upper seat, 24, is provided with a pocket, 27, in which is secured, by welding, bolting, or other suitable means, a load absorbing block, 28, provided with a bearing face, oppositely inclined to, and adapted to contact with, the bearing face of the block, 26. The combined length of the two blocks, 26 and 28, when the truck is in central position, is such that the bearing faces of the upper seat will be held out of contact with the rocker, 23, the entire load being borne by the blocks. The rockers and seats are thus efficiently protected, when the locomotive is running on tangent track, from the wear heretofore produced by vibration of the locomotive, and pounding of the load. As the area of contact between the contacting faces of the blocks, is materially greater than the area of contact presented in the centering devices heretofore known, the blocks will function to efficiently resist lateral vibration, and thus ensure steady riding of the locomotive.

It will be apparent that, by making the angle of the bearing faces of the blocks, less than that of the faces of upper rocker seat, the rockers will contact with the upper seats when the truck is displaced a slight distance from central position, by the stresses encountered on curved track.

Figs. 6 and 7 illustrate the application of the load absorbing blocks, 26 and 28, to a centering device embodying a roller, 29, having gear teeth, 30, at each end. In this construction, the upper roller seat, 24ª, is provided with oppositely inclined racks, 31, which mesh with the teeth, 30, of the roller, and the lower roller seat, 20ª, is provided with oppositely inclined racks, 32, which mesh with the teeth of the roller.

Figs. 8, 9 and 10 illustrate a modified form of construction wherein the underside of the lower bed, 20, is formed with a pocket, 20ᶜ, which slidingly receives the lower block, 26ª, having an inclined bearing face. The upper end of the block passes through an opening in the top wall of the pocket, and is reduced to provide an outwardly directed shoulder, 26ᵇ, adapted to contact with the flange, 20ᵇ, at the sides of the opening, to limit upward movement of the block. The block, 26ª, is made hollow, to provide a cavity which receives the helical spring, 33. In order to provide for regulating the compression of the spring, a plate, 34, is secured to the bottom of the bed, by bolts, 34ª, having adjusting nuts, 34ᵇ, and is formed with a raised portion, 34ᶜ, which fits into the bottom of the pocket, and bears against the bottom of the spring. The upper block, 28, is rigidly secured to the upper bed, 18, and has an inclined bearing face, adapted to contact with the bearing face of the lower block. From the foregoing description, it will be apparent that the pressure which the lower block exerts against the upper block, may be regulated as desired, by varying the compression of the spring through tightening or untightening the nuts, 34ᵇ. Thus, the vibration dampening effect of the blocks may be controlled as desired, and the bearing seats and rockers or rollers, relieved, on tangent track, of any desired portion of the load borne by them on curved track. It will be obvious that the spring may be arranged in the upper block, or that both blocks may be yieldingly urged into frictional contact by any suitable means.

So far as I am aware, it is broadly novel to combine, with a centering device, means for relieving the mechanism which carries the load, when the locomotive is travelling on curved track, from such load, when the locomotive is travelling on tangent track.

It is within the contemplation of the invention to provide means for suitably lubricating the bearing faces of the load absorbing blocks, and also to form each of the bearing faces of the blocks, with any suitable incline or inclines.

I claim as my invention and desire to secure by Letters Patent:

1. In a centering device for railroad vehicles, the combination of means for carrying, on curved track, a portion of the load of the vehicle; and means for carrying, on tangent track, a portion of the load borne by said first mentioned means on curved track, said last mentioned means also functioning, when carrying the load, to resist lateral vibrations of the vehicle.

2. In a centering device for railroad vehicles, the combination of means for carrying, on curved track, a portion of the load of the vehicle; and means for carrying, on tangent track, the load borne by said first mentioned means on a curved track, said last mentioned means also functioning, when carrying the load, to resist lateral vibration of the vehicle.

3. In a centering device for railroad vehicles, the combination of means for carrying, on curved track, a portion of the load of the vehicle; and means for carrying, on tangent track, a portion of the load borne by said first mentioned means on curved track; said last mentioned means also functioning, when carrying the load, to frictionally resist lateral vibration of the vehicle.

4. In a centering device for railroad vehicles, the combination of means for carrying, on curved track, a portion of the load of the vehicle; and means for carrying, on tangent track, the load borne by said first mentioned means on curved track; said last mentioned means also functioning, when carrying the load, to frictionally resist lateral vibration of the vehicle.

5. In a locomotive, the combination of a truck; a centering appliance, mounted thereon, said appliance comprising means for supporting a portion of the load of the locomotive, when the truck is displaced from central position; and means, acting, when the truck is returned to central position, to remove the load from the said first mentioned means, and support it while the truck remains in central position, said second mentioned means also functioning to resist lateral vibration of the locomotive.

6. In a locomotive, the combination of a truck; a centering appliance, comprising means for supporting a portion of the load of the locomotive, when the truck is displaced from central position; and means, acting, when the truck is returned to central position, to remove the load from said first mentioned means, and support it while the truck remains in central position; said second mentioned means also functioning to frictionally resist lateral vibration of the locomotive.

7. In a locomotive, the combination of a truck frame; a locomotive rear frame; a centering appliance, interposed between said frames, said appliance comprising means for supporting a portion of the load of the locomotive, when the truck is displaced from central position; and means, acting, when the truck is returned to central position, to remove a portion of the load from said first mentioned means, and support it while the truck remains in central position, said second mentioned means also functioning to resist lateral vibration of the locomotive when the truck is in central position.

8. In a locomotive, the combination of a truck frame; a locomotive rear frame; a centering appliance, interposed between said frames, said appliance comprising means for supporting a portion of the load of the locomotive, when the truck is displaced from central position; and means, acting, when the truck is returned to central position, to remove the load from said first mentioned means, and support it while the truck remains in central position, said second mentioned means also functioning to resist lateral vibration of the locomotive when the truck is in central position.

9. In a locomotive, the combination of a truck frame; a locomotive rear frame; a centering appliance, interposed between said frames, said appliance comprising means for supporting a portion of the load of the locomotive, when the truck is displaced from central position; and means, acting, when the truck is returned to central position, to remove the load from said first mentioned means, and support it while the truck remains in central position, said second mentioned means also functioning to frictionally resist lateral vibration of the locomotive, when the truck is in central position.

10. A centering appliance for railroad vehicles, comprising means for carrying a portion of the load of the vehicle, when the vehicle is running on curved track; and means for supporting, on tangent track, a portion of the load borne by the first mentioned means on curved track, said last mentioned means comprising an upper and a lower member, and means for yieldingly pressing said members into frictional contact when the vehicle is running on tangent track.

11. A centering device for railroad vehicles, comprising means for carrying a portion of the load of the vehicle, when the vehicle is running on curved track; and means for supporting, on tangent track, the load borne by the first mentioned means on curved track, said last mentioned means comprising an upper and a lower member; and means for yieldingly pressing said members into frictional contact when the vehicle is running on tangent track.

12. A centering appliance for railroad vehicles, comprising means for carrying a portion of the load of the vehicle, when the vehicle is running on curved track; and means for supporting, on tangent track, a portion of the load borne by said first mentioned means on curved track, said last mentioned means comprising opposed members; means for yieldingly pressing said members into frictional contact, when the vehicle is running on tangent track; and means for regulating the pressure exerted by said yielding means.

13. A centering appliance for railroad vehicles, comprising means for carrying a portion of the load of the vehicle, when the vehicle is running on curved track; and means for supporting, on tangent track, the load borne by said first mentioned means on curved track; said last mentioned means comprising opposed members; means for yieldingly pressing said members into frictional contact, when the vehicle is running on tangent track; and means for regulating the pressure exerted by said yielding means.

ALFRED W. BRUCE.